(12) United States Patent
Lepretre

(10) Patent No.: US 9,790,804 B2
(45) Date of Patent: Oct. 17, 2017

(54) GEARBOX OF AIRCRAFT TURBINE ENGINE

(71) Applicant: SAFRAN AIRCRAFT ENGINES, Paris (FR)

(72) Inventor: Jean-Baptiste Etienne Bernard Lepretre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/313,036

(22) PCT Filed: May 22, 2015

(86) PCT No.: PCT/FR2015/051374
§ 371 (c)(1),
(2) Date: Nov. 21, 2016

(87) PCT Pub. No.: WO2015/177487
PCT Pub. Date: Nov. 26, 2015

(65) Prior Publication Data
US 2017/0138214 A1 May 18, 2017

(30) Foreign Application Priority Data

May 23, 2014 (FR) ...................... 14 54679

(51) Int. Cl.
*F01D 15/12* (2006.01)
*F01D 25/16* (2006.01)
(Continued)

(52) U.S. Cl.
CPC ............. *F01D 15/12* (2013.01); *F01D 25/16* (2013.01); *F01D 25/18* (2013.01); *F01D 15/08* (2013.01);
(Continued)

(58) Field of Classification Search
CPC .......... F01D 15/12; F01D 25/16; F01D 25/18; F01D 5/08; F01D 5/10; F05D 2220/323; F05D 2260/98
See application file for complete search history.

(56) References Cited

U.S. PATENT DOCUMENTS 3,621,937 A 11/1971 Edge et al.
4,231,266 A * 11/1980 Nishikawa .......... F16C 33/6659
184/11.1
(Continued)

FOREIGN PATENT DOCUMENTS

EP 2 711 505 A1 3/2014
GB 2 488 142 A 8/2012

OTHER PUBLICATIONS

International Search Report mailed Sep. 3, 2015, issued in corresponding International Application No. PCT/FR2015/051374, filed May 22, 2015, 5 pages.
(Continued)

*Primary Examiner* — William E Dondero
*Assistant Examiner* — Mark K Buse
(74) *Attorney, Agent, or Firm* — Christensen O'Connor Johnson; Matthew Balint; John Denkenberger

(57) ABSTRACT

A gearbox for an aircraft turbine engine has a casing defining an enclosure for housing rotating elements lubricated by oil. At least one tubular sleeve is coupled to the rotating elements and configured to rotate a shaft. The sleeve includes splines configured to cooperate with complementary splines of said shaft. The gearbox further includes means for recovering lubricating oil from the rotating elements and conveying the recovered oil by streaming to the splines to lubricate the splines.

10 Claims, 2 Drawing Sheets

(51) Int. Cl.
*F01D 25/18* (2006.01)
*F01D 15/08* (2006.01)
*F01D 15/10* (2006.01)

(52) U.S. Cl.
CPC ........ *F01D 15/10* (2013.01); *F05D 2220/323* (2013.01); *F05D 2260/98* (2013.01)

(56) References Cited

U.S. PATENT DOCUMENTS

| | | | | |
|---|---|---|---|---|
| 8,657,073 B2* | 2/2014 | Matsumoto | ......... | F16H 57/0483 184/11.1 |
| 8,662,253 B2* | 3/2014 | Terada | ................. | F16H 57/043 184/6.5 |
| 2014/0076662 A1* | 3/2014 | Newberry | ............... | B64C 27/14 184/6.12 |

OTHER PUBLICATIONS

Written Opinion mailed Sep. 3, 2015, issued in corresponding International Application No. PCT/FR2015/051374, filed May 22, 2015, 6 pages.
Written Opinion of the International Searching Authority mailed Sep. 3, 2015, issued in corresponding International Application No. PCT/FR2015/051374, filed May 22, 2015, 6 pages.
International Preliminary Report on Patentability mailed Nov. 29, 2016, issued in corresponding International Application No. PCT/FR2015/051374, filed May 22, 2015, 1 page.

* cited by examiner

GEARBOX OF AIRCRAFT TURBINE ENGINE

TECHNICAL FIELD

The present invention relates to a gearbox for an aircraft turbine engine.

BACKGROUND OF THE INVENTION

The state of the art in particular comprises document EP-A1-2,711,505, U.S. Pat. No. 3,621,937 and GB-A-2,488,142.

A gearbox for an aircraft turbine engine, in particular for an airplane or helicopter turbojet engine or turboprop, may consist of an accessory gearbox (AGB), which is used to drive equipment of the turbine engine, such as pumps, electricity generators, etc. The accessory gearbox transmits mechanical power originating from the turbine engine to the equipment via a kinematic chain made up of rotating elements such as pinions or rolling bearings. A gearbox for an aircraft turbine engine may also consist of a transfer gearbox (TGB), for example to kinematically connect an accessory gearbox to a turbine shaft of the turbine engine by using two transfer shafts optionally forming an angle and connected to one another by the transfer gearbox.

Such a gearbox, in particular an accessory gearbox such as a transfer gearbox, comprises a casing defining an enclosure for housing rotating elements that are lubricated by oil, this oil further being able to serve to cool the casing. The gearbox comprises at least one tubular sleeve meshing with at least one rotating element and configured to be coupled to and rotate a shaft, for example a transfer shaft or the shaft of a piece of equipment of the turbine engine. This sleeve includes a female nesting part including splines configured to cooperate with splines of a male nesting part of the shaft.

The splines of the female nesting part of the sleeve and those of the male nesting part of the shaft must be lubricated. However, this lubrication requires only a very small amount of oil. It in fact suffices to ensure an oil level in the splines to lubricate the coupling. In the current technique, a continuously operating spray nozzle is generally used to lubricate these splines. The diameter of the spray nozzle may not be too small, which means that the splines are quite often over-lubricated. This results in needless oil consumption.

Document U.S. Pat. No. 5,119,905 illustrates a specific prior art relative to an accessory gearbox in which a spray nozzle is used intermittently. The jet of oil projected by the spray nozzle passes through a hole of the sleeve, when the engine is stopped. This technology has a drawback related to the fact that the filling of an annular reservoir supplying oil to the splines only occurs when the engine is stopped. The renewal of the oil allocated to lubricating the splines therefore only occurs particularly discontinuously over time.

The present invention in particular aims to provide a simple, effective and inexpensive solution to at least part of the aforementioned problems.

BRIEF DESCRIPTION OF THE INVENTION

The invention proposes a gearbox for an aircraft turbine engine, comprising a casing defining an enclosure for housing rotating elements lubricated by oil, and at least one tubular sleeve coupled to the rotating elements and configured to rotate a shaft, this sleeve including female splines configured to cooperate with male splines of said shaft, the box further comprising means for recovering lubricating oil from the rotating elements and conveying recovered oil by streaming to the splines to lubricate them, said recovery and conveying means comprising at least one inner wall collecting oil from said casing, the gearbox being configured to cause the oil to stream over said at least one collecting inner wall during the operation of the turbine engine, characterized in that said recovery and conveying means comprise a channeling member that extends at least partially inside said sleeve, and at least one gutter configured to convey the oil that streams over said at least one collecting inner wall to the channeling member, in which said channeling member and said at least one gutter are supported by or formed with a flange of the casing, this flange defining said at least one collecting inner wall and serving as a support for rolling bearing of the sleeve, the flange comprising at least one radial opening allowing oil flowing on said collecting inner wall to reach said channeling member.

The splines are thus lubricated by recovered oil lubricating the rotating elements and not by oil dedicated exclusively to lubricating the splines. At least part of lubricating oil of the rotating elements is thus recovered and conveyed to the splines without a direct contribution of oil from a spray nozzle. This makes it possible to limit the lubricating oil consumption of the gearbox. Furthermore, the recovery and conveyance of the oil can be done continuously during the operation of the engine, which is advantageous relative to the prior art.

The invention makes it possible to optimize the bulk of the gearbox. The recovery and conveying means do not hinder the rotational guiding of the sleeve, since the bearing near the recovery and conveying means is perfectly integrated in this configuration owing in particular to the radial opening provided in the cylindrical support wall of the bearing.

According to one embodiment of the invention, the flange has a planar part and a hollow cylindrical part that extends substantially perpendicular to the planar part and that supports the rolling bearing, said channeling member extending inside the cylindrical part from the planar part, and said at least one radial opening being arranged in the cylindrical part at the junction with the planar part such that the streaming oil passes through said at least one radial opening to be collected in said at least one gutter.

Preferably, the splines extend in a longitudinal annular cavity of the sleeve that is defined at one longitudinal end by an annular seal configured to cooperate with said shaft, and an opposite longitudinal end by an annular dam preferably formed by a leveling seal whereof the outer periphery defines the maximum oil level in said annular cavity.

Advantageously, the annular dam extends in a transverse plane that is traversed by the recovery and conveying means.

Advantageously, said flange comprises two gutters together forming a V with an angle of about 120-160°. The or each gutter can have a substantially U-shaped section. The or each gutter can extend substantially radially relative to the axis of said cylindrical part of the flange. The or each gutter can be situated in an axial space extending between said planar part of the flange and an end of the sleeve guided by said bearing. The channeling member can have a substantially U-shaped section.

The present invention also relates to a turbine engine, such as an aircraft turbojet engine or turboprop, characterized in that it comprises a gearbox as described above.

BRIEF DESCRIPTION OF THE FIGURES

The invention will be better understood and other details, features and advantages thereof will appear upon reading the following description, provided solely as a non-limiting example in reference to the appended drawings, in which.

DETAILED DESCRIPTION OF THE INVENTION

Figure 1:
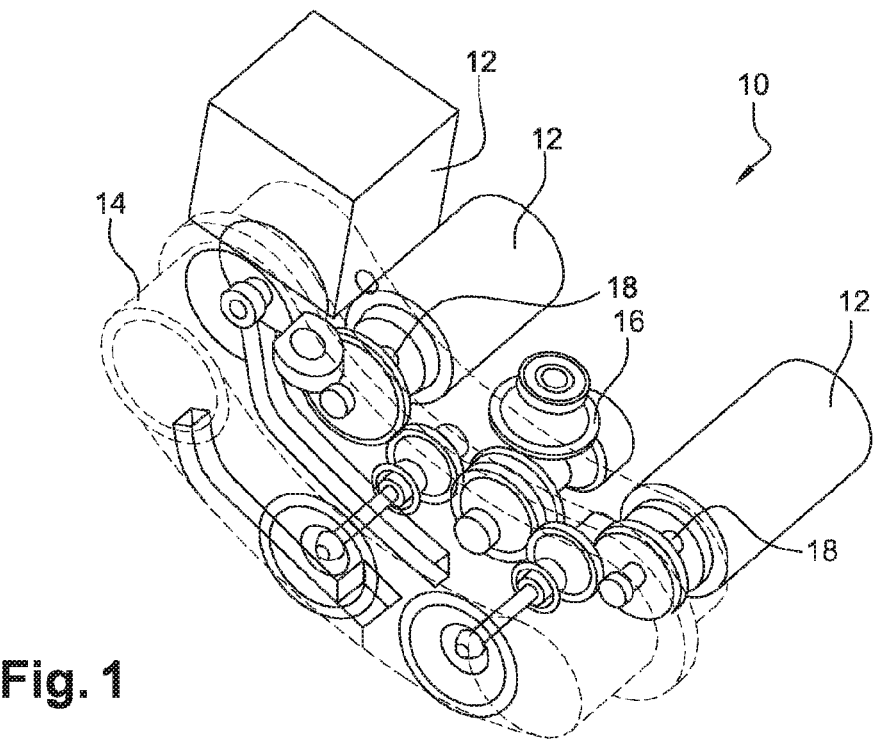
FIG. 1 is a diagrammatic perspective view of one example of an accessory gearbox of a turbine engine.

Reference will first be made to FIG. 1, which shows an example of an accessory gearbox 10 for driving equipment 12 of a turbine engine, such as an aircraft turbojet engine or turboprop. Such an accessory gearbox is in particular described in document FR-A1-2,941,744.

This gearbox 10 is intended to withdraw mechanical power originating from the turbine engine and transmit it to the pieces of equipment, which are pumps, electricity generators, etc. The transmission is done by a kinematic chain made up of rotating elements meshing with one another to form lines of gears or accessories.

The accessory gearbox 10 comprises a casing 14 defining an enclosure housing rotating elements that for example comprise pinions and rolling bearings. The kinematic chain is connected to a driveshaft 16 that is a radial shaft of the turbine engine or an intermediate shaft, the chain also being connected to movement shafts 18 of the pieces of equipment. The accessory gearbox 10 is fastened to the turbine engine and the pieces of equipment are generally in turn fastened to the accessory gearbox 10.

Figure 2:
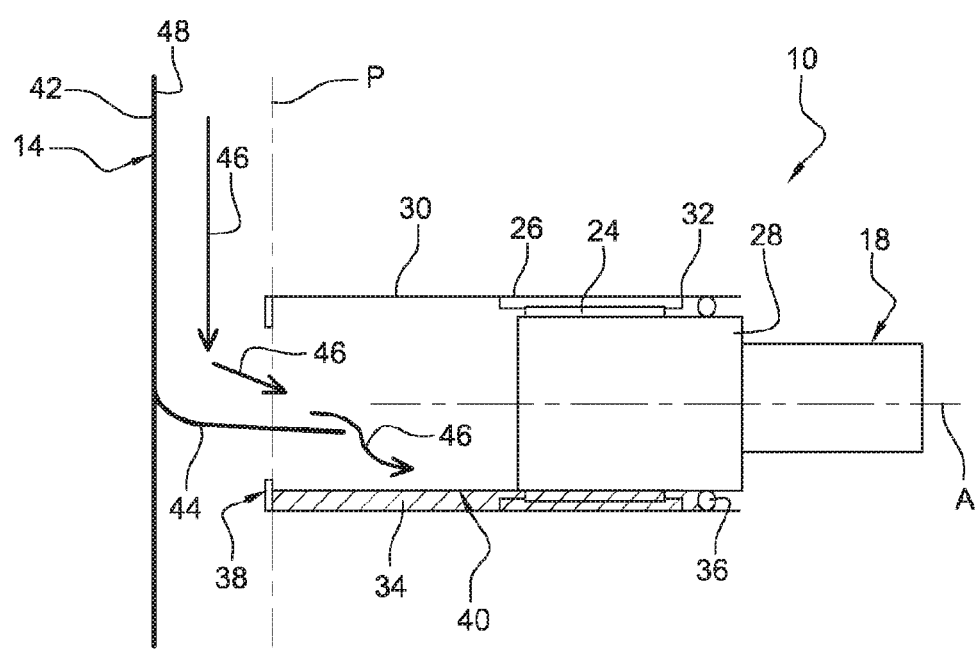
FIG. 2 is a very diagrammatic sectional view of an accessory gearbox according to the invention.

FIG. 2 shows one embodiment of the invention. References 10, 14 and 18 are also used to designate the accessory gearbox, its casing and the shaft of a piece of equipment, respectively. The example gearbox according to the invention described in reference to FIGS. 2 to 4 relates to an accessory gearbox, but it is understood that the embodiment described herein is also applicable to a transfer gearbox.

The coupling of the shaft 18 to the kinematic chain of the accessory gearbox 10 is done using splines 24, 26. The shaft 18 comprises a male end part 28 intended to be nested in a sleeve 30 making up a tubular part of the rotating element or a pinion of the accessory gearbox, this end part 28 including outer or male splines 24 that are preferably rectilinear splines extending substantially parallel to the rotation axis A of the shaft 18.

The accessory gearbox 10 comprises one or several pinion sleeves 30, each sleeve being used to rotate a shaft 18 of a piece of equipment and to transmit the power from the kinematic chain to this shaft.

The sleeve 30 comprises a female end part 32 intended to receive the end part 28 of the shaft 18, this end part 32 including inner or female splines 26 that are substantially complementary to the splines 24. They are therefore preferably rectilinear, extending substantially parallel to the rotation axis A of the shaft 18.

The splines 24, 26 here extend in an inner longitudinal cavity 34 of the sleeve 30 that is defined at one end, situated on the side of the shaft 18, by an annular seal 36, and at the opposite end by an annular dam 38. The annular seal 36 is supported by the sleeve 30 and is intended to cooperate with the shaft 18 to provide sealing against the oil between the sleeve 30 and the shaft 18. Alternatively, the seal 36 could be supported by the shaft 18 and cooperate with the sleeve 30. The annular dam 38 is preferably formed by an annular leveling seal. The cavity 34 makes it possible to store a predetermined volume of oil in which the splines 24, 26 bathe. The leveling seal (dam 38) is configured to define a maximum oil level 40 in the cavity 34, the excess oil then being discharged from the cavity 34 while flowing through the leveling seal.

The sleeve 30 rotates and is rotated by at least one rotating element of the accessory gearbox, for example another pinion. To that end, the sleeve can comprise a toothed wheel at its outer periphery suitable for meshing with the toothed wheel of another pinion. The sleeve 30 and its toothed wheel constitute a pinion.

The rotating elements of the accessory gearbox 10 are lubricated by oil, which can be brought into the inner enclosure of the casing 14 by spray nozzles, for example.

According to the invention, the accessory gearbox 10 comprises means for recovering lubricating oil from the rotating and conveying elements by streaming of the recovered oil to the splines 24, 26. These means here comprise a wall or flange 42 of the casing 14 on which at least part of the oil that was used to lubricate the rotating elements flows. This flange 42, which serves as a sealing cover for the casing, comprises or bears at least one inner wall 48 collecting lubricating oil of the rotating elements and a channeling member 44 that has an elongated shape and extends partially inside the sleeve 30 such that its free longitudinal end is situated as close as possible to the cavity 34 of the sleeve 30 and the oil can be conveyed and is discharged simply by streaming and gravity to this cavity 34 (arrow 46). The leveling seal (annular dam 38) thus extends in a transverse plane P that is traversed by the channeling member 44. Advantageously, the streaming by the member 44 is provided to be sufficient to compensate any minor oil leak at the seal 36.

Figure 3:
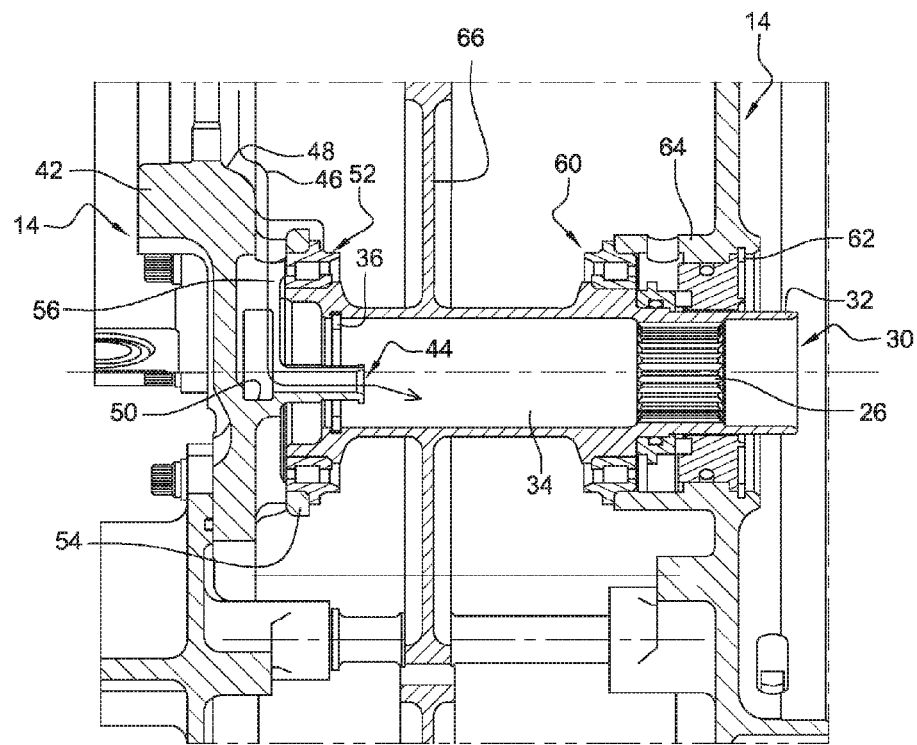
FIG. 3 is a diagrammatic sectional view of an accessory gearbox according to one example embodiment of the invention.
Figure 4:
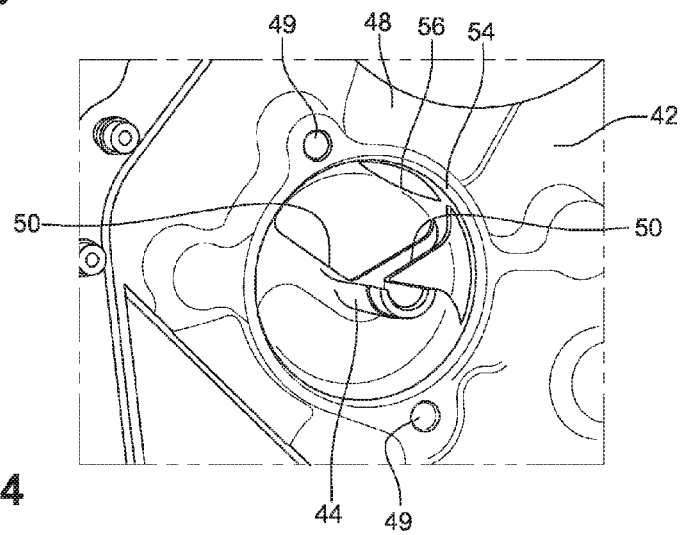
FIG. 4 is a partial perspective view of a casing flange of the accessory gearbox of FIG. 3.

FIGS. 3 and 4 show a more concrete example embodiment of the accessory gearbox 10 according to the invention, and in particular its flange 42 bearing the oil recovery and conveying means.

The flange 42 here is formed in a single piece and in particular comprises a planar part on the inner face of which at least one recess is formed defining a collecting inner wall 48 as described in the preceding.

The flange 42 also comprises a hollow cylindrical part 54 that extends substantially perpendicular to the planar part and that supports a rolling bearing 52 of the sleeve. The collecting inner wall 48 is substantially perpendicular to the axis of this cylindrical part 54. The rolling bearing 52 comprises an outer ring mounted in a free end part of the cylindrical part 54 and an inner ring mounted around an end part of the sleeve 30, opposite the splines 26. The sleeve 50 is thus partially engaged, by an end part, in the cylindrical part 54 of the flange 42. This end part is, however, at an axial distance from the planar part of the flange 42 in order to allow oil to flow between them (arrow 46), as will be described below.

The cylindrical part 54 here is formed by a boss of the flange that comprises outer radial extensions in which tapped screwing orifices 49 are provided for screws fastening the outer ring of the bearing 52 to the flange 42.

The cylindrical part 54 comprises a radial opening 56 at the junction with the wall 48 of the planar part of the flange 42. Oil can thus stream over the wall 48 to the inside of the cylindrical part 54, while passing through the opening 56.

The flange 42 further comprises, radially inside the cylindrical part 54, the aforementioned channeling member 44 as well as two gutters 50 that serve to collect the oil passing through the radial opening 56 and convey it to the longitudinal end of the member 44 connected to the planar part of the flange 42.

Each gutter 50 has a substantially U-shaped section and extends substantially radially relative to the axis of the cylindrical part 54, substantially from this axis to the cylindrical part 54. The gutters 50 together form a V with an angle of about 120-160°. The gutters 50 are situated substantially in the axial space extending between the planar part of the flange 42 and the end of the sleeve 30 guided by the bearing 52.

The channeling member 44 has a substantially U-shaped section and extends partially inside the sleeve 30 to be able to discharge the recovered oil into the inner cavity 34 of the sleeve. The cavity 34 is defined by the leveling seal (dam 38) and by the aforementioned sealing gasket (seal 36 in FIG. 2), which here is supported by the shaft and is therefore not shown. This sealing gasket is intended to cooperate with an inner cylindrical surface of the sleeve 30.

The end part of the sleeve 30 including the splines 26 is guided by another bearing 60 and is further surrounded by a dynamic sealing gasket 62, the bearing 60 and the seal 62 being mounted in a cylindrical wall 64 of the casing 14.

The sleeve 30 is further secured to an outwardly toothed wheel 66 so as to form a pinion.

The flange 42 of FIGS. 3 and 4 can be made by foundry for example, or by machining.

As diagrammatically shown by arrow 46 in FIG. 3, the oil that is sprayed or discharged during operation on the collecting wall 48 streams to the opening 56 and penetrates the cylindrical wall 54 to be collected in the gutters 50, which convey this oil to the channeling member 44. This oil next flows into the inner cavity 34 of the sleeve 30 for lubrication of the splines 26 as well as those of the corresponding equipment shaft. Because the channeling member 44 traverses the transverse plane in which the leveling seal (annular dam 38) extends, the oil that flows by gravity to the free end of this channeling member necessarily falls into the inner cavity 34 of the sleeve 30.

The oil contained in the inner cavity 34 is thus continuously renewed. Indeed, during the operation of the turbine engine, the entire annular space of the inner cavity 34 is filled with oil under the effect of the centrifugal force due to the rotation of the sleeve 30. The oil flowing in the sleeve 30 from the channeling member 44 mixes with the oil of the inner cavity 34. The excess oil in the inner cavity 34 overflows above the leveling seal 38 to return into the casing, or also to participate in lubricating bearing 52.

The channeling member 44 is advantageously arranged to extend substantially horizontally once the accessory gearbox is installed in the turbine engine, or to form a slight slope relative to the horizontal in most flight attitudes so as to favor the flow of the oil by gravity. The flow of the oil in the inner cavity 34 is thus not interrupted, except during exceptional and short flight attitudes. It may for example be provided that the opening of the sleeve 30 on the side of the leveling seal 38 is oriented toward the front of the aircraft, such that during the flight, the flow of the oil in the inner cavity 34 from the channeling member 44 can be interrupted only during any flight phase with a strong downward incline (in particular in case of nose-down acceleration).

Furthermore, the leveling seal 38 advantageously has a sufficient radial height so that, when the turbine engine is stopped, i.e., when the rotating elements of the accessory gearbox are no longer rotating, part of the splines of the sleeve and the shaft dabble in the oil retained in the bottom of the inner cavity 34. When the turbine engine is restarted, all of splines are quickly lubricated by this retained oil.

The invention claimed is:

1. A gearbox for an aircraft turbine engine, comprising a casing defining an enclosure for housing rotating elements lubricated by oil, and at least one tubular sleeve coupled to the rotating elements and configured to rotate a shaft, the sleeve including splines configured to cooperate with complementary splines of said shaft, the gearbox further comprising means for recovering lubricating oil from the rotating elements and conveying recovered oil by streaming to the splines to lubricate the splines, said recovery and conveying means comprising at least one inner wall collecting oil from said casing, the gearbox being configured to cause the oil to stream over said at least one collecting inner wall during the operation of the turbine engine, wherein said recovery and conveying means comprise a channeling member that extends at least partially inside said sleeve, and at least one gutter configured to convey the oil that streams over said at least one collecting inner wall to the channeling member, in which said channeling member and said at least one gutter are supported by or formed with a flange of the casing, the flange defining said at least one collecting inner wall and supporting a rolling bearing of the sleeve, the flange including at least one radial opening allowing oil flowing on said collecting inner wall to reach said channeling member.

2. The gearbox according to claim 1, wherein the flange has a planar part and a hollow cylindrical part that extends substantially perpendicular to the planar part and that supports the rolling bearing, said channeling member extending inside the cylindrical part from the planar part, and said at least one radial opening being arranged in the cylindrical part at a junction with the planar part such that the streaming oil passes through said at least one radial opening to be collected in said at least one gutter.

3. The gearbox according to claim 1, wherein said splines extend in a longitudinal annular cavity of the sleeve that is defined at one longitudinal end by an annular seal configured to cooperate with said shaft, and an opposite longitudinal end by an annular dam preferably formed by a leveling seal whereof the outer periphery defines a maximum oil level in said annular cavity.

4. The gearbox according to claim 3, wherein the annular dam extends in a transverse plane that is traversed by the recovery and conveying means.

5. The gearbox according claim 1, wherein said flange comprises two gutters together forming a V with an angle of about 120°-160°.

6. The gearbox according claim 1, wherein at least one of the at least one gutters has a substantially U-shaped section.

7. The gearbox according claim 1, wherein at least one of the at least one gutters extends substantially radially relative to the axis of said cylindrical part of the flange.

8. The gearbox according claim 1, wherein at least one of the at least one gutters is situated in an axial space extending between said planar part of the flange and an end of the sleeve guided by said bearing.

9. The gearbox according to claim 1, wherein the channeling member has a substantially U-shaped section.

10. An aircraft turbine engine, such as an airplane or helicopter turbojet engine or turboprop, comprising at least one gearbox according to claim 1.

* * * * *